United States Patent
Xu et al.

(10) Patent No.: US 11,578,986 B2
(45) Date of Patent: Feb. 14, 2023

(54) AUTONOMOUS DRIVING INSTRUCTIONS

(71) Applicant: HERE Global B.V., Eindhoven (NL)

(72) Inventors: Jingwei Xu, Buffalo Grove, IL (US); Sidhartha Routray, Eindhoven (NL)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/227,301

(22) Filed: Dec. 20, 2018

(65) Prior Publication Data

US 2020/0200558 A1   Jun. 25, 2020

(51) Int. Cl.
*G01C 21/34* (2006.01)
*G05D 1/00* (2006.01)

(52) U.S. Cl.
CPC ..... *G01C 21/3492* (2013.01); *G01C 21/3415* (2013.01); *G01C 21/3461* (2013.01); *G05D 1/0088* (2013.01); *G05D 2201/0213* (2013.01)

(58) Field of Classification Search
CPC ............ G01C 21/3492; G01C 21/3415; G01C 21/3461; G05D 1/0088
See application file for complete search history.

(56) References Cited

U.S. PATENT DOCUMENTS

| | | | |
|---|---|---|---|
| 9,365,213 B2 | 6/2016 | Stenneth et al. | |
| 9,528,850 B1 * | 12/2016 | Hobbs | G01C 21/367 |
| 9,688,288 B1 | 6/2017 | Lathrop et al. | |
| 9,919,716 B2 | 3/2018 | Christensen et al. | |
| 2016/0026182 A1 * | 1/2016 | Boroditsky | G05D 1/0088 |
| | | | 701/23 |
| 2017/0050638 A1 * | 2/2017 | Gordon | G05D 1/0289 |
| 2017/0066452 A1 | 3/2017 | Scofield | |
| 2017/0234689 A1 * | 8/2017 | Gibson | G05D 1/0061 |
| | | | 701/25 |
| 2017/0236210 A1 | 8/2017 | Kumar et al. | |
| 2018/0061230 A1 | 3/2018 | Madigan et al. | |
| 2018/0072315 A1 | 3/2018 | Enthaler et al. | |
| 2018/0108254 A1 | 10/2018 | Comacho et al. | |
| 2018/0341274 A1 * | 11/2018 | Donnelly | G01C 21/3492 |

(Continued)

OTHER PUBLICATIONS

*Future Proofing Infrastructure for Connected and Automated Vehicles*, Catapult Transport Systems, Technical Report (Feb. 2017) 74 pages.

(Continued)

*Primary Examiner* — James M McPherson
*Assistant Examiner* — Bakari Underwood
(74) *Attorney, Agent, or Firm* — Alston & Bird LLP

(57) ABSTRACT

Current data for a geographic area is accessed. The current data comprises at least one of (a) current traffic data for the geographic area, (b) current incident data for the geographic area, or (c) current weather data for the geographic area. Based on the current data, autonomous driving instructions are determined for the geographic area. A notification comprising the autonomous driving instructions is provided such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

18 Claims, 4 Drawing Sheets

(56) References Cited

U.S. PATENT DOCUMENTS

2020/0272146 A1* 8/2020 Ichikawa ............ B60W 50/082

OTHER PUBLICATIONS

Merat, N. et al., *How Do Drivers Behave in a Highly Automated Car?*, Proceedings of the Fifth International Driving Symposium on Human Factors in Driver Assessment, Training and Vehicle Design (Jan. 2009) 514-521.

Sparrow, R. et al., *When human beings are like drunk robots: Driverless vehicles, ethics, and the future of transport*, Transportation Research (2017) 17 pages.

Self-driving car—Wikipedia [online] [retrieved Apr. 29, 2019], Retrieved from the Internet: <URL: https://web.archive.org/web/20181207035339/https://en.wikipedia.org/wiki/Autonomous_car>. (dated Dec. 6, 2018) 24 pages.

Extended European Search Report for Application No. EP 19217931.5 dated May 19, 2020, 9 pages.

* cited by examiner

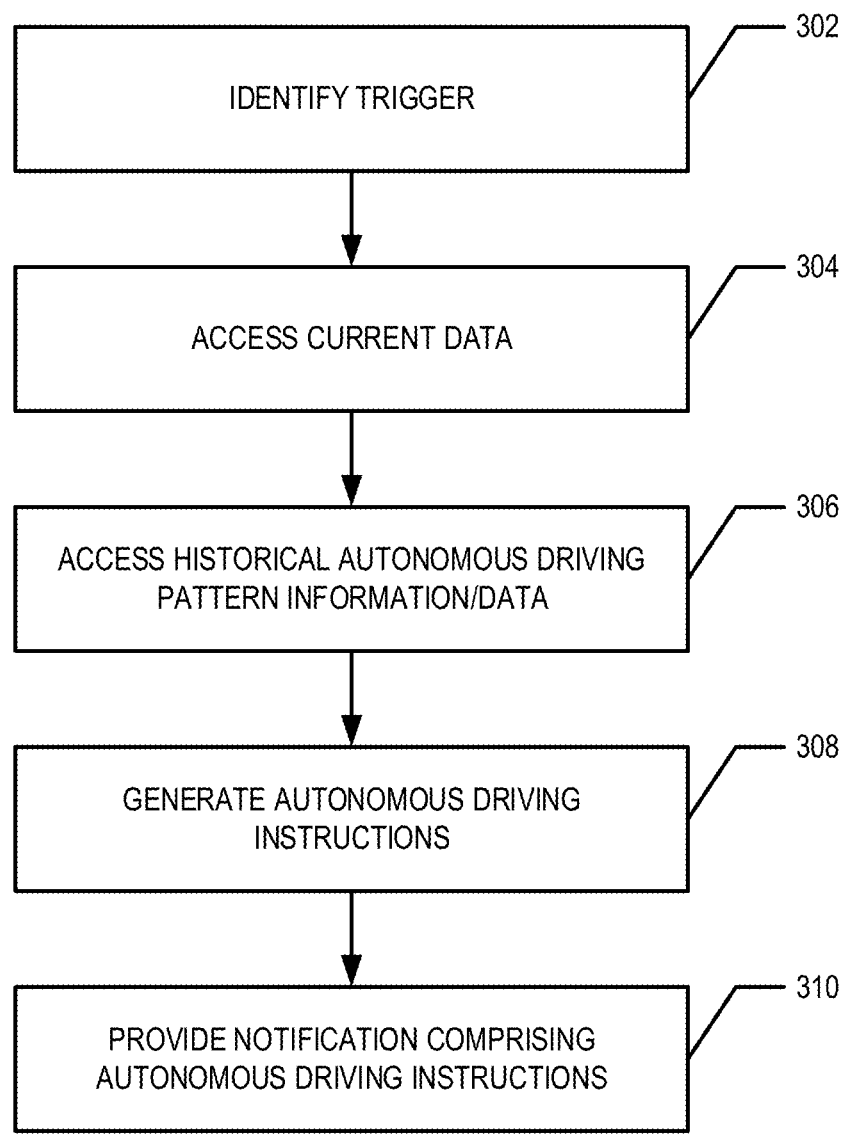

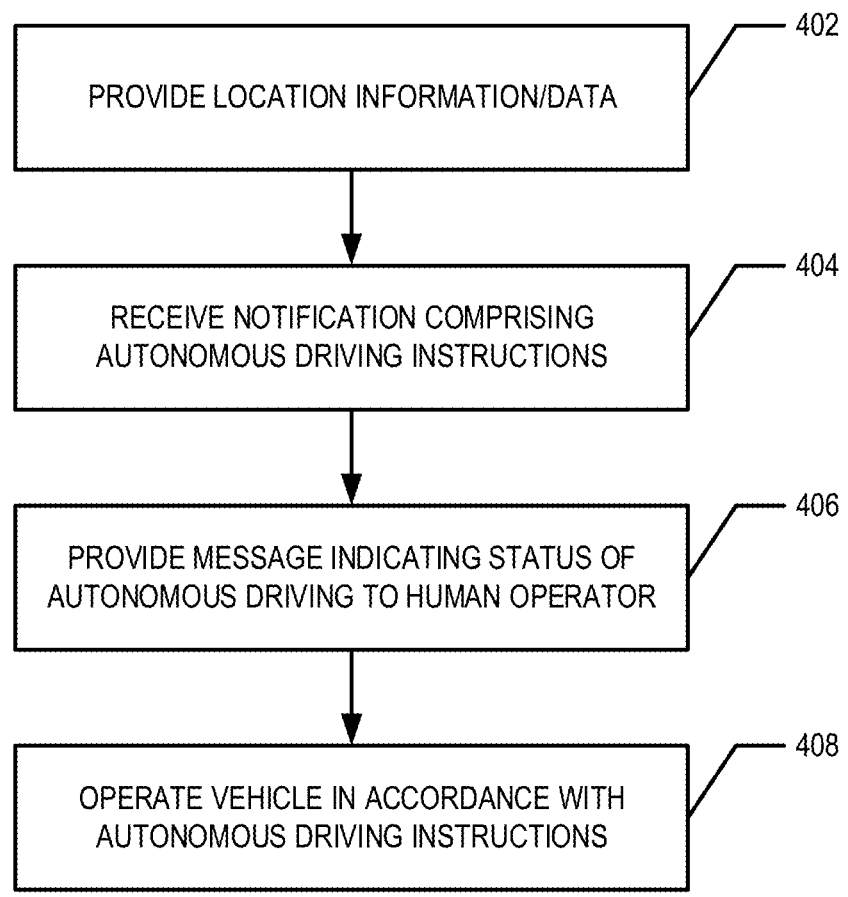

AUTONOMOUS DRIVING INSTRUCTIONS

TECHNOLOGICAL FIELD

An example embodiment relates generally to autonomous self-driving vehicles. An example embodiment relates generally to providing vehicles with autonomous self-driving capabilities with increased awareness regarding their environments.

BACKGROUND

Generally, vehicles with autonomous, self-driving capabilities rely on sensor information/data captured by sensors onboard the vehicle and map information/data stored in memory onboard the vehicle to determine driving strategy decisions. However, as vehicles with autonomous, self-driving capabilities become more common, having each vehicle determine its own driving strategy decisions may lead to traffic inefficiencies. Moreover, by basing driving strategy decisions on offline information/data such as the sensor information/data and the onboard map information/data, the vehicle may be lacking information/data that may lead to more efficient and safe driving strategy decisions.

BRIEF SUMMARY OF SOME EXAMPLE EMBODIMENTS

Various embodiments provide methods, systems, apparatuses, and computer program products for generating and providing autonomous driving instructions to vehicles having autonomous, self-driving capabilities. Various embodiments provide methods, systems, apparatuses, and computer program products for controlling a vehicle based on autonomous driving instructions. For example, embodiments of the present invention provide for vehicle apparatus to control a vehicle having autonomous, self-driving capabilities in accordance with autonomous driving instructions. For example, the vehicle apparatus may receive autonomous driving instructions corresponding to a geographic area and control the vehicle such that the vehicle travels through at least a portion of the geographic area in accordance with the autonomous driving instructions for the geographic area. In various embodiments, the autonomous driving instructions for a geographic area are determined based on current data, such as current and/or expected future traffic information/data for the geographic area, current and/or expected future incident information/data for the geographic area, current and/or expected future weather information/data, and/or the like. In an example embodiment, the current data is real time or near real time accurate. In an example embodiment, the autonomous driving instructions are determined based on historical autonomous driving pattern information/data for the geographic area. For example, the autonomous driving instructions may be configured to prevent autonomous driving through a human operator zone within the geographic area. For example, a human operator zone within the geographic area may be one or more road segments, intersections, and/or portions thereof that satisfy one or more criteria that indicate it may not be safe or efficient for a vehicle to be autonomously driven through the human operator zone (e.g., along the one or more road segments, intersections, and/or portions thereof). In an example embodiment, the autonomous driving instructions may indicate that (a) autonomous driving is enabled within the geographic area and/or one or more portions thereof or (b) autonomous driving is disabled and/or not allowed within the geographic area and/or one or more portions thereof (e.g., a human operator zone). In an example embodiment, the autonomous driving instructions may provide a route and/or one or more road segments, intersections, and/or portions thereof that an autonomous, self-driving vehicle are permitted to and/or should travel along through the geographic area. For example, the autonomous driving instructions may provide a preferred and/or approved autonomous driving route through at least a portion of the geographic area. In an example embodiment, the autonomous driving instructions may provide a vehicle apparatus configured to control a corresponding vehicle with information/data regarding the road and/or traffic conditions the vehicle is expected to experience as the vehicle apparatus navigates the vehicle through at least a portion of the geographic area.

Various embodiments of the present invention provide technical solutions to technical problems regarding the controlling of a vehicle having autonomous, self-driving capabilities by a corresponding vehicle apparatus. For example, the autonomous driving instructions coordinate various driving strategy decisions for vehicles with autonomous, self-driving capabilities within a geographic area. For example, the autonomous driving instructions may cause vehicles with autonomous, self-driving capabilities to avoid portions of a geographic area having high traffic density, high pedestrian density, active first responder and/or emergency activity, and/or the like, and thereby alleviate traffic back up in such portions of the geographic area and improving the efficiency of the road network in general within the geographic area. Additionally, the autonomous driving instructions may provide a vehicle apparatus configured to control a vehicle with autonomous, self-driving capabilities with additional information/data and/or context for making various driving strategy decisions. For example, the autonomous driving instructions may provide the vehicle apparatus within information/data that increases the vehicle apparatuses awareness of various scenarios and/or driving situations which the vehicle apparatus is likely to encounter as the corresponding vehicle travels through at least a portion of the geographic area.

In an example embodiment, current data for a geographic area is accessed. The current data comprises at least one of (a) current traffic data for the geographic area, (b) current incident data for the geographic area, or (c) current weather data for the geographic area. Based on the current data, autonomous driving instructions for the geographic area are determined. A notification comprising the autonomous driving instructions is provided such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

In accordance with an aspect of the present invention, a method for generating and providing autonomous driving instructions by a network apparatus is provided. In an example embodiment, the method comprises accessing current data for a geographic area. The current data comprises at least one of (a) current traffic data for the geographic area, (b) current incident data for the geographic area, or (c) current weather data for the geographic area. The method further comprises based on the current data, determining autonomous driving instructions for the geographic area. The method further comprises providing a notification comprising the autonomous driving instructions such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

In an example embodiment, the method further comprises accessing historical autonomous driving pattern data for the geographic area, wherein the autonomous driving instructions are determined based at least in part on the historical autonomous driving pattern data. In an example embodiment, the autonomous driving instructions comprise one of (a) an indication that autonomous driving is enabled within at least a portion of the geographic area or (b) an indication that autonomous driving is disabled within at least a portion of the geographic area. In an example embodiment, the autonomous driving instructions comprise a suggest route through at least a portion of the geographic area along which autonomous driving is enabled. In an example embodiment, determining the autonomous driving instructions for the geographic area comprises determining the suggested route. In an example embodiment, the current data is real time or near real time accurate with respect to conditions being experienced within the geographic area. In an example embodiment, the current data comprises dynamic map data. In an example embodiment, the current data comprises at least one of (a) expected future traffic data for the geographic area, (b) expected future incident data for the geographic area, or (c) expected future weather data for the geographic area. In an example embodiment, determining the autonomous driving instructions for the geographic area comprises determining whether a human operator zone exists within the geographic area based on the current data; and responsive to determining that a human operator zone exists within the geographic area, generating autonomous driving instructions that (a) disable autonomous driving with the human operator zone, (b) provide a suggested route through at least a portion of the geographic area that avoids the human operator zone, or (c) both disable autonomous driving with the human operator zone and provide a suggested route through at least a portion of the geographic area that avoids the human operator zone. In an example embodiment, a human operator zone is at least a portion of a geographic area experiencing or expected to experience traffic and/or weather conditions that are not appropriate for autonomous driving.

According to another aspect of the present invention, an apparatus is provided. In an example embodiment, the apparatus comprises at least one processor, at least one non-transitory memory storing computer program code, and at least one communications interface configured to communicate via at least one network. The computer program code is configured to, when executed by the at least one processor, cause the apparatus to at least access current data for a geographic area. The current data comprises at least one of (a) current traffic data for the geographic area, (b) current incident data for the geographic area, or (c) current weather data for the geographic area. The computer program code is further configured to, when executed by the at least one processor, cause the apparatus to at least, based on the current data, determine autonomous driving instructions for the geographic area. The computer program code is further configured to, when executed by the at least one processor, cause the apparatus to at least, provide a notification comprising the autonomous driving instructions such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

In an example embodiment, the computer program code is further configured to, when executed by the at least one processor, cause the apparatus to at least, access historical autonomous driving pattern data for the geographic area, wherein the autonomous driving instructions are determined based at least in part on the historical autonomous driving pattern data. In an example embodiment, the autonomous driving instructions comprise one of (a) an indication that autonomous driving is enabled within at least a portion of the geographic area or (b) an indication that autonomous driving is disabled within at least a portion of the geographic area. In an example embodiment, the autonomous driving instructions comprise a suggest route through at least a portion of the geographic area along which autonomous driving is enabled. In an example embodiment, determining the autonomous driving instructions for the geographic area comprises determining the suggested route. In an example embodiment, the current data is real time or near real time accurate with respect to conditions being experienced within the geographic area. In an example embodiment, the current data comprises dynamic map data. In an example embodiment, the current data comprises at least one of (a) expected future traffic data for the geographic area, (b) expected future incident data for the geographic area, or (c) expected future weather data for the geographic area. In an example embodiment, determining the autonomous driving instructions for the geographic area comprises determining whether a human operator zone exists within the geographic area based on the current data; and responsive to determining that a human operator zone exists within the geographic area, generating autonomous driving instructions that (a) disable autonomous driving with the human operator zone, (b) provide a suggested route through at least a portion of the geographic area that avoids the human operator zone, or (c) both disable autonomous driving with the human operator zone and provide a suggested route through at least a portion of the geographic area that avoids the human operator zone. In an example embodiment, a human operator zone is at least a portion of a geographic area experiencing or expected to experience traffic and/or weather conditions that are not appropriate for autonomous driving.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least access current data for a geographic area. The current data comprises at least one of (a) current traffic data for the geographic area, (b) current incident data for the geographic area, or (c) current weather data for the geographic area. The computer-executable program code instructions further comprise program code instructions configured to, when executed by the processor of an apparatus, cause the apparatus to at least, based on the current data, determine autonomous driving instructions for the geographic area. The computer-executable program code instructions further comprise program code instructions configured to, when executed by the processor of an apparatus, cause the apparatus to at least, provide a notification comprising the autonomous driving instructions such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

In an example embodiment, the computer-executable program code instructions further comprise program code instructions configured to, when executed by the processor of an apparatus, cause the apparatus to at least, access historical autonomous driving pattern data for the geographic area, wherein the autonomous driving instructions are determined based at least in part on the historical autonomous driving pattern data. In an example embodiment, the autonomous driving instructions comprise one of (a) an indication that autonomous driving is enabled within at least a portion of the geographic area or (b) an indication that autonomous driving is disabled within at least a portion of the geographic area. In an example embodiment, the autonomous driving instructions comprise a suggest route through at least a portion of the geographic area along which autonomous driving is enabled. In an example embodiment, determining the autonomous driving instructions for the geographic area comprises determining the suggested route. In an example embodiment, the current data is real time or near real time accurate with respect to conditions being experienced within the geographic area. In an example embodiment, the current data comprises dynamic map data. In an example embodiment, the current data comprises at least one of (a) expected future traffic data for the geographic area, (b) expected future incident data for the geographic area, or (c) expected future weather data for the geographic area. In an example embodiment, determining the autonomous driving instructions for the geographic area comprises determining whether a human operator zone exists within the geographic area based on the current data; and responsive to determining that a human operator zone exists within the geographic area, generating autonomous driving instructions that (a) disable autonomous driving with the human operator zone, (b) provide a suggested route through at least a portion of the geographic area that avoids the human operator zone, or (c) both disable autonomous driving with the human operator zone and provide a suggested route through at least a portion of the geographic area that avoids the human operator zone. In an example embodiment, a human operator zone is at least a portion of a geographic area experiencing or expected to experience traffic and/or weather conditions that are not appropriate for autonomous driving.

In still another aspect of the present invention, an apparatus is provided. In an example embodiment, the apparatus comprises means for accessing current data for a geographic area. The current data comprising at least one of (a) current traffic data for the geographic area, (b) current incident data for the geographic area, or (c) current weather data for the geographic area. The apparatus comprises means for determining autonomous driving instructions for the geographic area based on the current data. The apparatus comprises means for providing a notification comprising the autonomous driving instructions such that the notification is received by a vehicle apparatus located within the geographic area or expected to enter the geographic area based on a route being traversed by a vehicle corresponding to the vehicle apparatus. The vehicle apparatus is onboard the vehicle and is configured to control the vehicle in accordance with the autonomous driving instructions.

In an example embodiment, a vehicle apparatus onboard a vehicle having autonomous driving capabilities receives a notification comprising autonomous driving instructions corresponding to (a) a geographic area and (b) an active time period during which the autonomous driving instructions are active. The vehicle apparatus controls one or more systems of the vehicle to operate the vehicle in accordance with the autonomous driving instructions when (a) the vehicle is located within the geographic area and (b) the autonomous driving instructions are active.

In accordance with an aspect of the present invention, a method for operating a vehicle in accordance with autonomous driving instructions is provided. In an example embodiment, the method comprises receiving, by a vehicle apparatus onboard a vehicle having autonomous driving capabilities, a notification comprising autonomous driving instructions. The autonomous driving instructions correspond to (a) a geographic area and (b) an active time period during which the autonomous driving instructions are active. The method further comprises controlling, by the vehicle apparatus, one or more systems of the vehicle to operate the vehicle in accordance with the autonomous driving instructions when (a) the vehicle is located within the geographic area and (b) the autonomous driving instructions are active.

In an example embodiment, the method further comprises processing the autonomous driving instructions to identify one or more portions of a route along which the vehicle is traversing through at least a portion of the geographic area where autonomous driving is not enabled. In an example embodiment, the method further comprises providing a message to a human operator of the vehicle indicating a status or status change of autonomous driving based on the autonomous driving instructions and at least one of a current location of the vehicle or an expected future location of the vehicle. In an example embodiment, the method further comprises determining a new route based on the autonomous driving instructions. In an example embodiment, the autonomous driving instructions comprise one or more suggested routes and the new route is determined based on at least one of the one or more suggested routes. In an example embodiment, the autonomous driving instructions comprise one or more human operator zones and the new route is determined to avoid traversing through the at least one of the one or more human operator zones. In an example embodiment, the autonomous driving instructions comprise current data comprising at least one of (a) traffic data, (b) incident data, (c) weather data, or (d) dynamic map data and the vehicle apparatus is configured to make one or more driving strategy decisions based on the current data.

According to another aspect of the present invention, an apparatus is provided. In an example embodiment, the apparatus comprises at least one processor, at least one non-transitory memory storing computer program code, and at least one communications interface configured to communicate via at least one network. The apparatus is onboard a vehicle having autonomous driving capabilities. The computer program code is configured to, when executed by the at least one processor, cause the apparatus to at least receive a notification comprising autonomous driving instructions. The autonomous driving instructions correspond to (a) a geographic area and (b) an active time period during which the autonomous driving instructions are active. The computer program code is further configured to, when executed by the at least one processor, cause the apparatus to at least control one or more systems of the vehicle to operate the vehicle in accordance with the autonomous driving instructions when (a) the vehicle is located within the geographic area and (b) the autonomous driving instructions are active.

In an example embodiment, the computer program code is further configured to, when executed by the at least one processor, cause the apparatus to at least process the autonomous driving instructions to identify one or more portions of a route along which the vehicle is traversing through at least a portion of the geographic area where autonomous driving is not enabled. In an example embodiment, the computer program code is further configured to, when executed by the at least one processor, cause the apparatus to at least provide a message to a human operator of the vehicle indicating a status or status change of autonomous driving based on the autonomous driving instructions and at least one of a current location of the vehicle or an expected future location of the vehicle. In an example embodiment, the computer program code is further configured to, when executed by the at least one processor, cause the apparatus to at least determine a new route based on the autonomous driving instructions. In an example embodiment, the autonomous driving instructions comprise one or more suggested routes and the new route is determined based on at least one of the one or more suggested routes. In an example embodiment, the autonomous driving instructions comprise one or more human operator zones and the new route is determined to avoid traversing through the at least one of the one or more human operator zones. In an example embodiment, the autonomous driving instructions comprise current data comprising at least one of (a) traffic data, (b) incident data, (c) weather data, or (d) dynamic map data and the vehicle apparatus is configured to make one or more driving strategy decisions based on the current data.

In accordance with still another aspect of the present invention, a computer program product is provided. The computer program product comprises at least one non-transitory computer-readable storage medium having computer-executable program code instructions stored therein. The computer-executable program code instructions comprise program code instructions configured to, when executed by a processor of an apparatus, cause the apparatus to at least receive a notification comprising autonomous driving instructions. The apparatus is onboard a vehicle having autonomous driving capabilities. The autonomous driving instructions correspond to (a) a geographic area and (b) an active time period during which the autonomous driving instructions are active. The computer-executable program code instructions further comprise program code instructions configured to, when executed by the processor of an apparatus, cause the apparatus to at least control one or more systems of the vehicle to operate the vehicle in accordance with the autonomous driving instructions when (a) the vehicle is located within the geographic area and (b) the autonomous driving instructions are active.

In an example embodiment, the computer program code is further configured to, when executed by the at least one processor, cause the apparatus to at least process the autonomous driving instructions to identify one or more portions of a route along which the vehicle is traversing through at least a portion of the geographic area where autonomous driving is not enabled. In an example embodiment, the computer-executable program code instructions further comprise program code instructions configured to, when executed by the processor of an apparatus, cause the apparatus to at least provide a message to a human operator of the vehicle indicating a status or status change of autonomous driving based on the autonomous driving instructions and at least one of a current location of the vehicle or an expected future location of the vehicle. In an example embodiment, the computer-executable program code instructions further comprise program code instructions configured to, when executed by the processor of an apparatus, cause the apparatus to at least determine a new route based on the autonomous driving instructions. In an example embodiment, the autonomous driving instructions comprise one or more suggested routes and the new route is determined based on at least one of the one or more suggested routes. In an example embodiment, the autonomous driving instructions comprise one or more human operator zones and the new route is determined to avoid traversing through the at least one of the one or more human operator zones. In an example embodiment, the autonomous driving instructions comprise current data comprising at least one of (a) traffic data, (b) incident data, (c) weather data, or (d) dynamic map data and the vehicle apparatus is configured to make one or more driving strategy decisions based on the current data.

In still another aspect of the present invention, an apparatus is provided. The apparatus is onboard a vehicle having autonomous driving capabilities. In an example embodiment, the apparatus comprises means for receiving a notification comprising autonomous driving instructions. The autonomous driving instructions correspond to (a) a geographic area and (b) an active time period during which the autonomous driving instructions are active. The apparatus comprises means for controlling one or more systems of the vehicle to operate the vehicle in accordance with the autonomous driving instructions when (a) the vehicle is located within the geographic area and (b) the autonomous driving instructions are active.

BRIEF DESCRIPTION OF THE DRAWINGS

Figure 1:
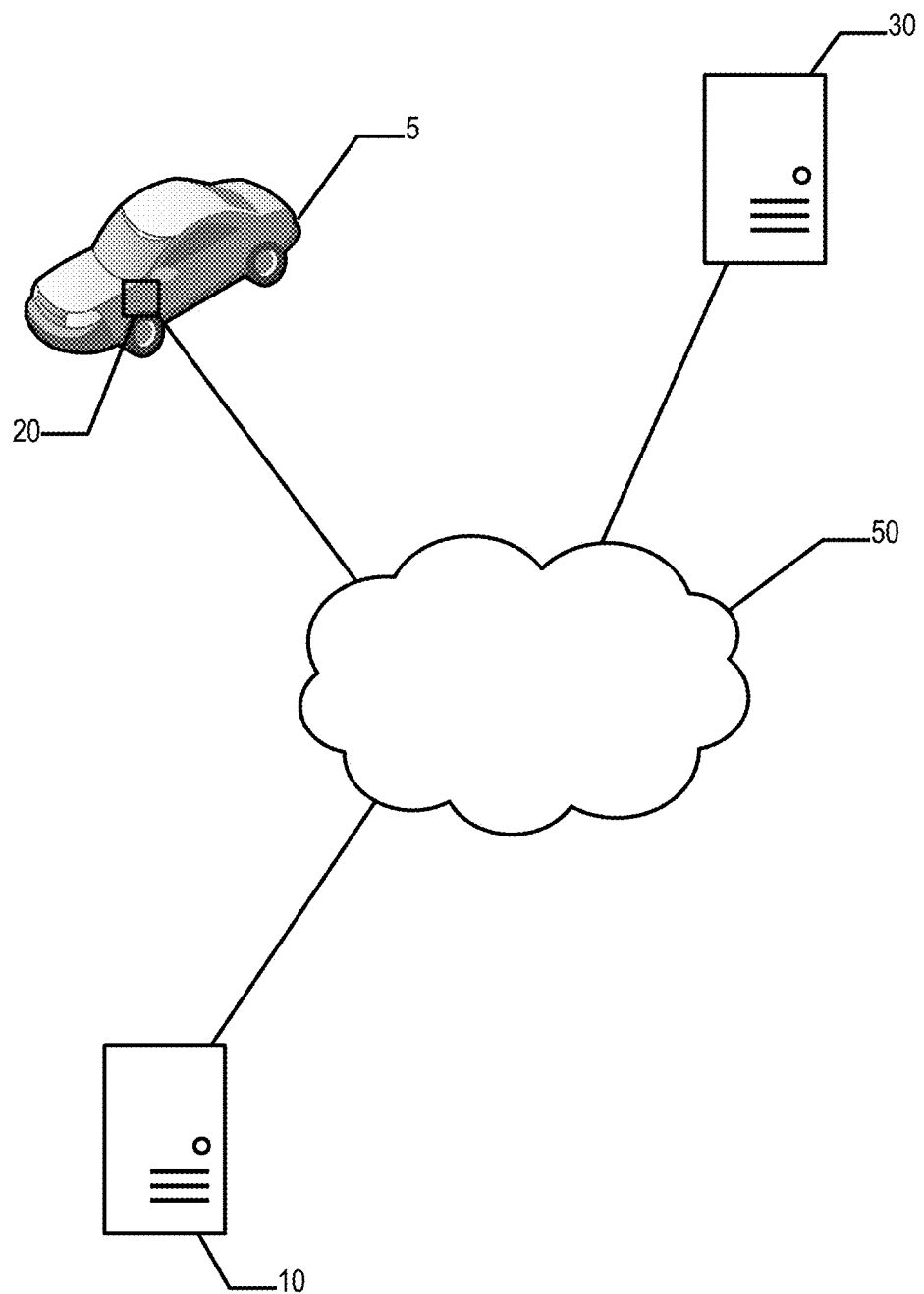
Figure 2A:
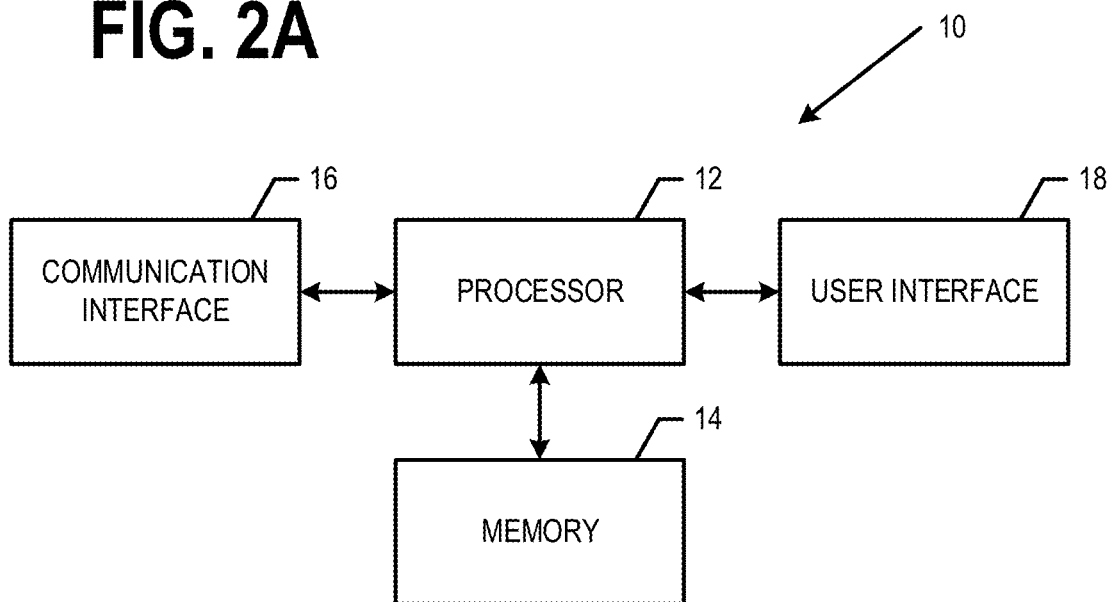
Figure 2B:
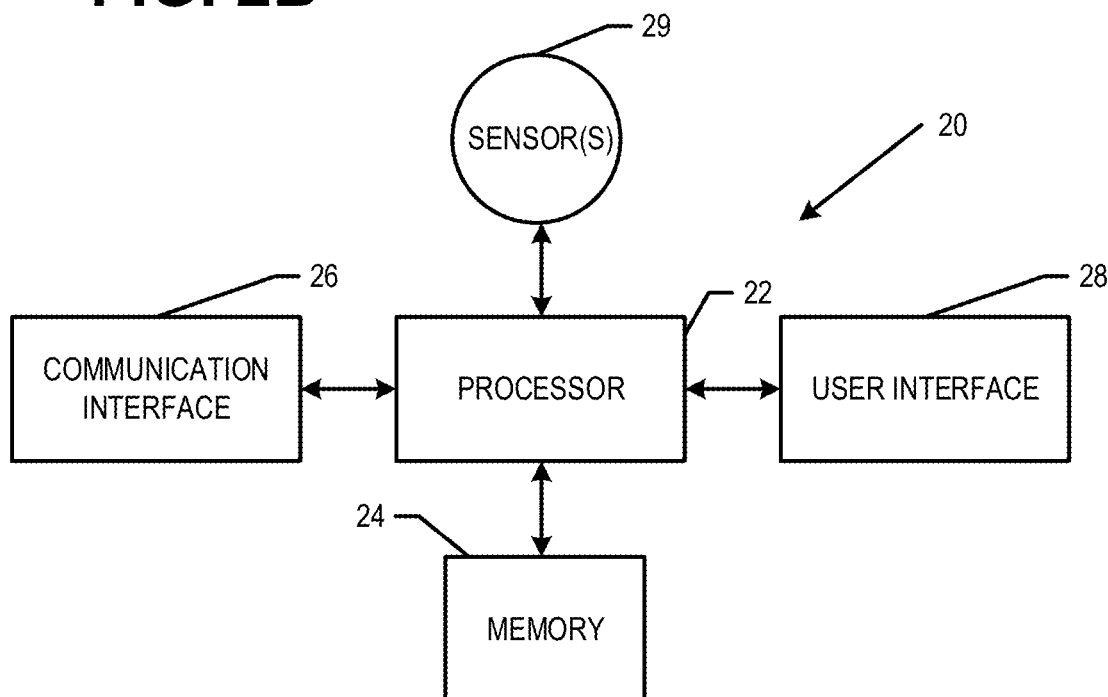

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a network apparatus that may be specifically configured in accordance with an example embodiment;

FIG. 2B is a block diagram of a vehicle apparatus that may be specifically configured in accordance with an example embodiment;

FIG. 3 is a flowchart illustrating operations performed, such as by the network apparatus of FIG. 2A, to generate and provide autonomous driving instructions, according to an example embodiment; and FIG. 4 is a flowchart illustrating operations performed, such as by the vehicle apparatus of FIG. 2B, to control a vehicle in accordance with autonomous driving instructions, according to an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. As used herein, the terms "substantially" and "approximately" refer to values that are within manufacturing and/or engineering guidelines, allowances, and/or limits. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus, systems, and computer program products are provided for generating and providing autonomous driving instructions for a geographic area based on current data. In various embodiments, current data comprises traffic information/data for the geographic area, incident information/data for the geographic area, weather information/data, and/or the like. In various embodiments, a geographic area is a defined region of a road network. In various embodiments, a geographic area may be a road segment, an intersection, and/or collection of road segments and/or intersections. For example, a geographic area may correspond to a block, a neighborhood, the portion of a road network represented by a tile of a digital map, a cluster of neighborhoods, a city or town, a county, a state or territory or province, geographic region (e.g., the Northeast, Southeast, Midwest, Pacific Northwest, and/or the like), country, and/or the like.

For example, a network apparatus may generate autonomous driving instructions for a geographic area based at least in part on current data corresponding to the geographic area and provide the autonomous driving instructions to one or more vehicle apparatuses that are located within the geographic area and/or that are expected to be located within the geographic area within a predefined time period. In an example embodiment, the predefined time period is the period of time for which the autonomous driving instructions are relevant. For example, the autonomous driving instructions may be active and/or valid for five minutes, ten minutes, fifteen minutes, twenty minutes, thirty minutes, forty-five minutes, sixty minutes and/or the like after the autonomous driving instructions were generated and the autonomous driving instructions may expire thereafter. The predefined time period corresponds to the time that the autonomous driving instructions are active and/or valid, in an example embodiment.

Various embodiments provide methods, apparatus, systems, and computer program products for receiving and operating a vehicle in accordance with autonomous driving instructions. In various embodiments, autonomous driving instructions may indicate that autonomous driving is or is not enabled, allowed, permitted, and/or the like within one or more portions of a geographic area. For example, a human operator zone may be identified within a geographic area and the autonomous driving instructions may indicate that autonomous driving is not enabled, allowed, permitted, and/or the like within the human operator zone. In an example embodiment, the autonomous driving instructions may comprise one or more suggested routes at least partially through the geographic area that may be and/or should be used by autonomously driven vehicles. For example, a vehicle apparatus may control a corresponding vehicle with autonomous driving capabilities in accordance with the autonomous driving instructions. For example, the vehicle apparatus may use the autonomous driving instructions to perform one or more navigation functions. Some non-limiting examples of navigation functions are localization, route determination, lane level route determination, route travel time determination, lane maintenance, route guidance, lane level route guidance, provision of traffic information/data, provision of lane level traffic information/data, and/or the like. In an example embodiment, the vehicle apparatus is configured to provide one or more messages indicating the status (e.g., allowed/not allowed, enabled/disabled, and/or the like) of autonomous driving at one or more locations along a route being traveled by the vehicle. For example, a message may indicate that the status of autonomous driving is expected to and/or will change in a particular number of minutes, in a particular number of miles, and/or the like as the vehicle traverses the route. For example, a message may indicate when and/or where human intervention is expected to be required.

As noted above, the network apparatus may generate autonomous driving instructions for a geographic area. In various embodiments, the autonomous driving instructions are active and/or valid for a period of time and, after the period of time has elapsed, the autonomous driving instructions are considered to be expired. For example, the network apparatus may periodically generate autonomous driving instructions for a geographic area. In an example embodiment, the network apparatus may generate autonomous driving instructions in response to receiving or identifying a trigger, such as receiving an incident report indicating an incident has occurred within the geographic area, that emergency personnel and/or first responders have been dispatched to the geographic area, a traffic report from a traffic management agency, and/or the like. In such a scenario, previous autonomous driving instructions may be superseded by the new autonomous driving instructions generated in response to the trigger even if the time period during which the previous autonomous driving instructions are active and/or valid has not yet expired.

The network apparatus is configured to generate the autonomous driving instructions for a geographic area based on current data for the geographic area. In various embodiments, current data comprises current and/or expected future traffic information/data for the geographic area, current and/or expected future incident information/data for the geographic area, current and/or expected future weather information/data, and/or the like. In an example embodiment, the current data is real time or near real time accurate. The network apparatus 10 may generate the current data and/or portions thereof and/or may request and receive the current data and/or portions thereof from one or more informer apparatuses.

In various embodiments, the autonomous driving instructions are generated based on historical autonomous driving patterns information/data corresponding to the geographic area. For example, the historical autonomous driving patterns information/data may indicate routes, road segments, intersections, and/or the like through/within the geographic area that are commonly used by vehicles that are being autonomously driven (e.g., under the control of the corresponding vehicle apparatus); road segments, intersections, and/or the like that have previously proved difficult for vehicles that are being autonomously driven to maneuver, and/or the like. In an example embodiment, the historical autonomous driving patterns information/data may include static and dynamic information/data. For example, a particular road segment may be difficult for a vehicle being autonomously driven to maneuver along because of the topology of the road segment (e.g., steep hills, sharp turns, and/or the like) and thus the indication that the particular road segment is difficult for vehicles being autonomously driven to maneuver along is static (e.g., not time dependent and/or independent of changes in the current data). In another example, a particular road segment may be difficult for a vehicle being autonomously driven to maneuver along at certain times of day or during certain events because of large numbers of pedestrians present at the certain times of day or during the certain events and thus the indication that the particular road segment is difficult for vehicles being autonomously driven to maneuver along is dynamic (e.g., time dependent and/or varies based on the current data). In yet another example, a particular road segment may be difficult for a vehicle being autonomously driven to maneuver along during certain weather conditions and thus the indication that the particular road segment is difficult for vehicles being autonomously driven to maneuver along is dynamic (e.g., time dependent and/or varies based on the current data).

In an example embodiment, the network apparatus generates autonomous driving instructions based on and/or using an instructions model. For example, the instructions model may be configured and/or programmed to receive the current data and/or historical autonomous driving pattern information/data as inputs and to provide autonomous driving instructions as an output. In an example embodiment, the instructions model uses a developer defined algorithm to generate the autonomous driving instructions based on the current data and/or historical autonomous driving pattern information/data. In an example embodiment, the instructions model is a machine trained (e.g., trained via a machine learning algorithm) neural network, deep net, model, and/or the like.

FIG. 1 provides an illustration of an example system that can be used in conjunction with various embodiments of the present invention. As shown in FIG. 1, the system may include one or more network apparatuses 10, one or more vehicle apparatuses 20, wherein each vehicle apparatus 20 is disposed on a vehicle 5, one or more informer apparatuses 30, one or more networks 50, and/or the like.

In various embodiments, the vehicle apparatus 20, may be an in vehicle navigation system, vehicle control system, a mobile computing device, a mobile data gathering platform, and/or the like. For example, a vehicle apparatus 20 may be an in vehicle navigation system mounted within, coupled to, and/or onboard a vehicle 5 such as a motor vehicle, non-motor vehicle, automobile, car, scooter, truck, van, bus, motorcycle, bicycle, Segway, golf cart, and/or the like. In various embodiments, the vehicle 5 is a vehicle having autonomous, self-driving capabilities. For example, the vehicle apparatus 20 may be configured to control the vehicle 5 such that the vehicle 5 so as to autonomously drive the vehicle 5. In an example embodiment, the vehicle apparatus 20 is a vehicle control system configured to autonomously drive a vehicle 5, assist in control of a vehicle 5 (e.g., an advanced driver-assistance system (ADAS)), monitor various aspects of the vehicle 5 (e.g., fault conditions, motor oil status, battery charge level, fuel tank fill level, and/or the like), and/or the like. In various embodiments, the vehicle apparatus 20 is configured to autonomously drive a vehicle 5 and may perform multiple functions that are similar to those performed by a vehicle apparatus 20 configured to be an ADAS (e.g., lane keeping, lane change assistance, maintaining a lane, merging, etc.). In some embodiments, vehicle apparatus 20 may be onboard a personal vehicle, commercial vehicle, public transportation vehicle, fleet vehicle, and/or other vehicle. In an example embodiment, a vehicle apparatus 20 is onboard a vehicle 5 and is used to perform one or more navigation functions corresponding to the vehicle 5 traversing at least a portion of a road network. Some non-limiting examples of navigation functions are localization, route determination, lane level route determination, route travel time determination, lane maintenance, route guidance, lane level route guidance, provision of traffic information/data, provision of lane level traffic information/data, and/or the like.

In an example embodiment, the network apparatus 10 may be a server, group of servers, distributed computing system, and/or other computing system. For example, the network apparatus 10 may be in communication with one or more vehicle apparatuses 20, one or more informer apparatuses 30, and/or the like via one or more wired and/or wireless networks 50. In an example embodiment, the network apparatus 10 is remotely located with respect to the vehicle apparatus 20 as the network apparatus 10 is not onboard and/coupled to the vehicle 5.

In an example embodiment, a network apparatus 10 may comprise components similar to those shown in the example network apparatus 10 diagrammed in FIG. 2A. In various embodiments, the network apparatus 10 is configured to probe information/data (e.g., via one or more networks 50) and determine current data and/or to receive current data (e.g., via one or more networks 50) from one or more informer apparatuses 30, generate and/or access historical autonomous driving pattern information/data, determine autonomous driving instructions based on the current data and/or historical autonomous driving pattern information, and provide notifications (e.g., via one or more networks 50) comprising the autonomous driving instructions. In an example embodiment, the network apparatus 10 may be configured to identify one or more human operator zones within a geographic area, determine one or more suggested routes through the geographic area that avoid any human operator zones within the geographic area, and/or the like. For example, as shown in FIG. 2A, the network apparatus 10 may comprise a processor 12, memory 14, a user interface 18, a communications interface 16, and/or other components configured to perform various operations, procedures, functions or the like described herein. In at least some example embodiments, the memory 14 is non-transitory.

In various embodiments, a vehicle apparatus 20 is configured to provide location and/or route information/data, receive notifications comprising autonomous driving instructions, and control the corresponding vehicle 5 in accordance with the autonomous driving instructions, and/or the like. In an example embodiment, as shown in FIG. 2B, the vehicle apparatus 20 may comprise a processor 22, memory 24, a communications interface 26, a user interface 28, and one or more sensors 29. In an example embodiment, the one or more sensors 29 may comprise one or more of one or more location sensors such one or more of a GNSS sensor; IMU sensors; an odometry system, and/or the like; and/or other components configured to perform various operations, procedures, functions or the like described herein. For example, in an example embodiment, a vehicle apparatus 20 may comprise and/or be in communication with one or more sensors 29 comprising one or more of, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In at least some example embodiments, the memory 24 is non-transitory. In various embodiments, the memory 24 may store at least a portion of a geographic database, digital map, and/or the like comprising map information/data.

In various embodiments, an informer apparatus 30 may be a server, group of servers, distributed computing system, and/or other computing system. In various embodiments, the informer apparatus 30 may be configured to determine current and/or expected future traffic information/data for at least a portion of a geographic area (e.g., based on probe information/data, and/or the like); determine current and/or expected future incident information/data for at least a portion of the geographic area (e.g., based on emergency vehicle and/or first responder dispatches, Department of Transportation and/or traffic management reports, and/or the like); determine current and/or expected weather information/data for at least a portion of the geographic area (e.g., based on weather information/data generated, measured, captured, and/or the like by one or more sensors of a weather station); and/or the like. In an example embodiment, the informer apparatus 30 is configured to provide the current data to a network apparatus 10 (e.g., in response to a current data request from the network apparatus 10, in response to a trigger, and/or periodically/regularly). In an example embodiment, the informer apparatus 30 may comprise a processor, memory, a user interface, a communications interface, and/or other components configured to perform various operations, procedures, functions or the like described herein. In at least some example embodiments, the informer apparatus 30 comprises a non-transitory memory.

In an example embodiment, a network apparatus 10 may be in communication with one or more apparatuses 20, informer apparatuses 30, and/or other computing entities via one or more wired and/or wireless networks 50. For example, each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network (e.g., 5G, 4G, LTE, 3G, and/or the like), short and/or medium range communications, fiber to wireless, Wi-Fi, radio data system (RDS) messages over the air radio interface, transport protocol experts group (TPEG) service by connected HyperText Transfer Protocol (HTTP) or User Datagram Protocol (UDP), and/or the like and/or combinations thereof. In some embodiments, a network 50 may comprise the automotive cloud, digital transportation infrastructure (DTI), radio data system (RDS)/high definition (HD) radio or other digital radio system, and/or the like. For example, a vehicle apparatus 20 may be in communication with a network apparatus 10 via the network 50. For example, a network apparatus 10 may communicate with a vehicle apparatus 20 via a network, such as the Cloud. For example, the Cloud may be a computer network that provides shared computer processing resources and data to computers and other devices connected thereto. In another example, a vehicle apparatus 20 may be configured to receive communications (e.g., a notification comprising autonomous driving instructions) via a short and/or mid-range communication protocol. For example, a first responder apparatus onboard a first responder and/or emergency vehicle may communicate (e.g., a notification comprising autonomous driving instructions) with a vehicle apparatus 20 via a DSRC message as defined by SAE J2735.

Certain example embodiments of the network apparatus 10, vehicle apparatus 20, and/or informer apparatus 30 are described in more detail below with respect to FIGS. 2A and 2B.

II. Example Operation

Methods, apparatus, systems, and computer program products are provided for generating and providing autonomous driving instructions for a geographic area based on current data. In various embodiments, current data comprises traffic information/data for the geographic area, incident information/data for the geographic area, weather information/data, and/or the like. For example, a network apparatus 10 may generate autonomous driving instructions for a geographic area based at least in part on current data corresponding to the geographic area. The network apparatus 10 may further provide a notification comprising the autonomous driving instructions such that one or more vehicle apparatuses 20 that are located within the geographic area and/or that are expected to be located within the geographic area within a predefined time period receive the autonomous driving instructions and control and/or operate corresponding vehicles 5 having autonomous driving capabilities in accordance with the autonomous driving instructions. In an example embodiment, the predefined time period is the period of time for which the autonomous driving instructions are active and/or valid (or expected to be active and/or valid). For example, the autonomous driving instructions may be active and/or valid for five minutes, ten minutes, fifteen minutes, twenty minutes, thirty minutes, forty-five minutes, sixty minutes and/or the like after the autonomous driving instructions were generated and the autonomous driving instructions may expire thereafter. The predefined time period corresponds to the time that the autonomous driving instructions are active and/or valid, in an example embodiment.

As noted above, the network apparatus 10 may generate autonomous driving instructions for a geographic area. In various embodiments, the autonomous driving instructions are active and/or valid for a period of time and, after the period of time has elapsed, the autonomous driving instructions are considered to be expired. For example, the network apparatus 10 may periodically generate autonomous driving instructions for a geographic area. In an example embodiment, the network apparatus 10 may generate autonomous driving instructions in response to receiving or identifying a trigger, such as receiving an incident report indicating an incident has occurred within the geographic area, that emergency personnel and/or first responders have been dispatched to the geographic area, a traffic report from a traffic management agency, and/or the like. In such a scenario, previous autonomous driving instructions may be superseded by the new autonomous driving instructions generated in response to the trigger even if the time period during which the previous autonomous driving instructions are active and/or valid has not yet expired.

The network apparatus 10 is configured to generate the autonomous driving instructions for a geographic area based on current data for the geographic area. In various embodiments, current data comprises current and/or expected future traffic information/data for the geographic area, current and/or expected future incident information/data for the geographic area, current and/or expected future weather information/data, and/or the like. In an example embodiment, the current data is real time or near real time accurate. In an example embodiment, the current data may include map information/data from a digital map, geographic database, and/or the like. For example, the map information/data may comprise dynamic (e.g., time dependent) map information/data corresponding to one or more road segments and/or intersections of the geographic area. For example, a road segment may have a reversible lane and therefore the topology of the road segment is time dependent. In another example, a road segment may have a variable speed limit, and therefore the link information/data corresponding to the road segment is time dependent and/or traffic condition dependent. In another example, a point of interest (POI) may have particular operating hours and therefore the corresponding POI information/data may be time dependent. In still another example, an intersection may be particularly prone to black ice and/or flooding and therefore the corresponding intersection information/data may be weather dependent. Thus, map information/data may be dynamic (e.g., time dependent and/or weather dependent), in various embodiments. In various embodiments, the network apparatus 10 may generate the current data and/or portions thereof and/or may request and receive the current data and/or portions thereof from one or more informer apparatuses 30.

For example, the network apparatus 10 may receive probe information/data from one or more probe vehicles traversing portions of the geographic area and determine current and/or expected future traffic information/data therefrom, in an example embodiment. For example, the network apparatus 10 may store information/data regarding historical traffic conditions and determine expected future traffic information/data based thereon. In an example embodiment, the network apparatus 10 may receive current and/or future expected traffic information/data from one or more informer apparatuses 30. In various embodiments, traffic information/data indicates traffic conditions such as a traffic flow indicator (e.g., a traffic flow ratio, traffic flow ratio class indicator, and/or the like wherein the traffic flow ratio is the ratio of a representative traffic speed and free flow speed) for one or more road segments, intersections, and/or the like; a representative traffic speed; a range of traffic speeds; a traffic volume measure; and/or other information/data corresponding to traffic conditions.

In an example embodiment, the network apparatus 10 may receive information/data regarding incidents and/or probe information/data from one or more probe vehicles traversing portions of the geographic area and determine current and/or expected future incident information/data therefrom, in an example embodiment. In an example embodiment, the network apparatus 10 may receive current and/or future expected incident information/data from one or more informer apparatuses 30. In various embodiments, incident information/data is information/data regarding incidents such as collisions, malfunctioning traffic signals, construction, road/lane closures due to planned or unplanned events, and/or the like.

In an example embodiment, the network apparatus 10 may receive information/data regarding sensor information/data captured, measured, collected, and/or the like by one or more weather station sensors. For example, one or more informer apparatuses 30 may provide sensor information/data captured, measured, collected, and/or the like by one or more weather station sensors such that the network apparatus 10 receives the sensor information/data. In an example embodiment, the network apparatus 10 may receive a current and/or expected future weather report(s) from one or more informer apparatuses 30. Based on the sensor information/data and/or the current and/or expected future weather report(s) the network apparatus 10 may determine and/or identify current and/or expected future weather information/data for the geographic area (and/or portions of the geographic area). In various embodiments, the weather information/data may include pavement conditions (e.g., wet, icy, dry, black ice, standing water, snow covered, and/or the like).

In various embodiments, network apparatus 10 generates the autonomous driving instructions based on historical autonomous driving patterns information/data corresponding to the geographic area. For example, the historical autonomous driving patterns information/data may indicate routes, road segments, intersections, and/or the like through/within the geographic area that are commonly used by vehicles 5 that are being autonomously driven (e.g., under the control of the corresponding vehicle apparatus 20); road segments, intersections, and/or the like that have previously proved difficult for vehicles 5 that are being autonomously driven to maneuver, and/or the like. In an example embodiment, the historical autonomous driving patterns information/data may include static (e.g., time and current data independent) and dynamic (e.g., time and/or current data dependent) information/data. For example, a particular road segment may be difficult for a vehicle being autonomously driven to maneuver along because of the topology of the road segment (e.g., steep hills, sharp turns, and/or the like) and thus the indication that the particular road segment is difficult for vehicles being autonomously driven to maneuver along is static (e.g., not time dependent and/or independent of changes in the current data). In another example, a particular road segment may be difficult for a vehicle being autonomously driven to maneuver along at certain times of day or during certain events because of large numbers of pedestrians present at the certain times of day or during the certain events and thus the indication that the particular road segment is difficult for vehicles being autonomously driven to maneuver along is dynamic (e.g., time dependent and/or varies based on the current data). In yet another example, a particular road segment may be difficult for a vehicle being autonomously driven to maneuver along during certain weather conditions and thus the indication that the particular road segment is difficult for vehicles being autonomously driven to maneuver along is dynamic (e.g., time dependent and/or varies based on the current data).

In an example embodiment, the network apparatus 10 generates autonomous driving instructions based on and/or using an instructions model. For example, the instructions model may be configured and/or programmed to receive the current data and/or historical autonomous driving pattern information/data as inputs and to provide autonomous driving instructions as an output. In an example embodiment, the instructions model uses a developer defined algorithm to generate the autonomous driving instructions based on the current data and/or historical autonomous driving pattern information/data. In an example embodiment, the instructions model is a machine trained (e.g., trained via a machine learning algorithm) neural network, deep net, model, and/or the like that generates autonomous driving instructions based on the current data and/or historical autonomous driving pattern information/data.

In an example embodiment, the instructions model is configured to determine if any human operator zones currently exist and/or are expected to exist within the geographic area within the predefined time period. A human operator zone is at least a portion of a geographic area (e.g., one or more road segments, intersections, and/or portions thereof) experiencing (or expected to experience within the predefined time period) traffic and/or weather conditions that are not appropriate for autonomous driving. For example, a human operator zone may be a portion of a geographic area around a traffic accident and/or where emergency personnel and/or first responders are active. In an example embodiment, a human operator zone may be at least a portion of a geographic area experiencing substantial pedestrian traffic, black ice, snow covered roadways, a construction zone with construction workers on site, and/or the like. In various embodiments, when a human operator zone is identified within the geographic region, the autonomous driving instructions indicate that autonomous driving is not allowed, enabled, permitted and/or the like in the human operator zone. In an example embodiment, when a human operator zone is identified within the geographic region, one or more routes at least partially through the geographic region that avoid the human operator zone are determined and may be provided as part of the autonomous driving instructions.

In various embodiments, autonomous driving instructions may indicate that autonomous driving is or is not enabled, allowed, permitted, and/or the like within one or more portions of a geographic area. For example, a human operator zone may be identified within a geographic area and the autonomous driving instructions may indicate that autonomous driving is not enabled, allowed, permitted, and/or the like within the human operator zone. In an example embodiment, the autonomous driving instructions may comprise one or more suggested routes at least partially through the geographic area that may be and/or should be used by autonomously driven vehicles 5. In an example embodiment, the autonomous driving instructions include at least a portion of the current data. For example, the autonomous driving instructions may include the portion of the current data used to determine the presence a human operator zone identified within the geographic area (e.g., first responders responding to collision on segment 5234, traffic flow rate equal to 0.1 on segment 3422, active construction zone on lane 9834, standing water on lane 2341 and/or the like). For example, the autonomous driving instructions may include the portion of the current data used to determine the one or more suggested routes that may and/or should be used by vehicles 5 being autonomously driven. Thus, in an example embodiment, the autonomous driving instructions may provide instructions regarding portions of a geographic area where a vehicle 5 may be autonomously driven (e.g., under the control of vehicle apparatus 20), portions of the geographic area where a vehicle 5 may not be autonomously driven, and a context for why autonomous driving is or is not allowed, permitted, enabled, and/or the like within at least one of the portions of the geographic area.

Various embodiments of the present invention provide methods, apparatus, systems, and computer program products for receiving and operating a vehicle in accordance with autonomous driving instructions. For example, a vehicle apparatus 20 may be onboard and/or coupled to a vehicle 5 having autonomous driving capabilities. The vehicle apparatus may receive autonomous driving instructions and control the vehicle 5 in accordance with the autonomous driving instructions. For example, the vehicle apparatus may use the autonomous driving instructions to perform one or more navigation functions. Some non-limiting examples of navigation functions are localization, route determination, lane level route determination, route travel time determination, lane maintenance, route guidance, lane level route guidance, provision of traffic information/data, provision of lane level traffic information/data, and/or the like. For example, if the autonomous driving instructions indicate that autonomous driving is not allowed, permitted, enabled, and/or the like along a portion of a route being traversed by the vehicle 5, the vehicle apparatus 20 may determine a new route along which autonomous driving is allowed, permitted, and/or enabled or may provide a message (e.g., via user interface 28) to a human operator of the vehicle 5 that the human operator will need to control the vehicle 5 along at least a portion of the route. In an example embodiment, the vehicle apparatus 20 is configured to provide one or more messages indicating the status (e.g., allowed/not allowed, enabled/disabled, and/or the like) of autonomous driving at one or more locations along a route being traveled by the vehicle. For example, a message may indicate that the status of autonomous driving is expected to and/or will change in a particular number of minutes, in a particular number of miles, and/or the like as the vehicle traverses the route. For example, a message may indicate when and/or where human intervention is expected to be required such that the human operator may be prepared to take control at the appropriate time and/or location.

Exemplary Operation of a Network Apparatus

FIG. 3 provides a flowchart illustrating operations performed, such as by the network apparatus 10, to generate and provide autonomous driving instructions, such that a vehicle apparatus 20 may control a vehicle 5 having autonomous driving capabilities in accordance with the autonomous driving instructions, according to an example embodiment.

Starting at block 302, an instruction trigger corresponding to a geographic area is received and/or identified. For example, the network apparatus 10 may receive and/or identify an instruction trigger corresponding to the geographic area. For example, the network apparatus 10 may comprise means, such as the processor 12, memory 14, communications interface 16, user interface 18, and/or the like for receiving and/or identifying an instruction trigger corresponding to the geographic area. For example, the instruction trigger may be a periodic or regular trigger such that autonomous driving instructions are active and/or valid for a period of time and then expire. For example, the network apparatus 10 may configured to generate autonomous driving instructions for the geographic region on a periodic basis such that when and/or prior to a previous autonomous driving instruction expiring, a new autonomous driving instruction is generated and provided. In an example embodiment, the instruction trigger may indicate the detection of an incident (e.g., based on probe information/data, the dispatch of emergency personnel and/or first responders, an alert provided by a traffic management system, and/or the like). In an example embodiment, the detected incident may be a weather-based incident (e.g., a tornado warning being issued, a tornado being sighted, high water level in a roadside creek being reported, a hurricane evacuation order being announced, and/or the like). When new autonomous driving instructions are generated and provided, the new autonomous driving instructions supersede any previously provided autonomous driving instructions, even if the time period for the previously provided autonomous driving instructions to be active and/or valid has not yet expired, in an example embodiment.

At block 304, current data is accessed. For example, the network apparatus 10 may access current data corresponding to the geographic area. For example, the network apparatus 10 may comprise means, such as the processor 12, memory 14, communications interface 16, user interface 18, and/or the like for accessing current data corresponding to the geographic area. In an example embodiment, the current data, and/or a portion thereof, is determined by the network apparatus 10 based on probe information/data generated by probe vehicles traversing at least a portion of the geographic area, determined by the network apparatus 10 based on sensor information/data captured by one or more weather station sensors, accessed by the network apparatus 10 from memory 14 (e.g., a geographic database stored in memory 14), and/or the like. In an example embodiment, the current data, and/or a portion thereof, is provided by one or more informer apparatuses 30 (e.g., in response to a request generated and provided by the network apparatus 10; as a periodic providing of traffic, incident, weather, map, and/or similar information/data; as a "push" providing of traffic, incident, weather, map, and/or similar information/data; and/or the like). In an example embodiment, current data is accessed for each road segment of the geographic area. In an example embodiment, current data is accessed for each road segment and intersection of the geographic area.

In various embodiments, current data comprises current and/or expected future traffic information/data for the geographic area, current and/or expected future incident information/data for the geographic area, current and/or expected future weather information/data, and/or the like. In an example embodiment, the current data is real time or near real time accurate with respect to the current traffic, weather, incident, road topology, and/or the like conditions being experienced in the corresponding portions of the geographic area. In an example embodiment, the current data may include map information/data from a digital map, geographic database, and/or the like. For example, the map information/data may comprise dynamic (e.g., time dependent) map information/data corresponding to one or more road segments and/or intersections of the geographic area. For example, a road segment may have a reversible lane and therefore the topology of the road segment is time dependent. For example, a point of interest (POI) may have particular operating hours and therefore the corresponding POI information/data may be time dependent. For example, an intersection may be particularly prone to black ice and/or flooding and therefore the corresponding intersection information/data may be weather dependent. In an example embodiment, the dynamic map information/data may comprise signal phasing and timing (SPaT) information/data for one or more traffic signals located within the geographic area. Thus, map information/data may be dynamic (e.g., time dependent and/or weather dependent), in various embodiments. In various embodiments, the network apparatus 10 may generate the current data and/or portions thereof and/or may request and receive the current data and/or portions thereof from one or more informer apparatuses 30.

For example, the network apparatus 10 may receive probe information/data from one or more probe vehicles traversing portions of the geographic area and determine current and/or expected future traffic information/data therefrom, in an example embodiment. For example, the network apparatus 10 may store information/data regarding historical traffic conditions and determine expected future traffic information/data based thereon. In an example embodiment, the network apparatus 10 may receive current and/or future expected traffic information/data from one or more informer apparatuses 30. In various embodiments, traffic information/data indicates traffic conditions such as a traffic flow indicator (e.g., a traffic flow ratio, traffic flow ratio class indicator, and/or the like wherein the traffic flow ratio is the ratio of a representative traffic speed and free flow speed) for one or more road segments, intersections, and/or the like; a representative traffic speed; a range of traffic speeds; a traffic volume measure; and/or other information/data corresponding to traffic conditions.

In an example embodiment, the network apparatus 10 may receive information/data regarding incidents and/or probe information/data from one or more probe vehicles traversing portions of the geographic area and determine current and/or expected future incident information/data therefrom, in an example embodiment. In an example embodiment, the network apparatus 10 may receive current and/or future expected incident information/data from one or more informer apparatuses 30. In various embodiments, incident information/data is information/data regarding incidents such as collisions, malfunctioning traffic signals, construction, road/lane closures due to planned or unplanned events, and/or the like.

In an example embodiment, the network apparatus 10 may receive information/data regarding sensor information/data captured, measured, collected, and/or the like by one or more weather station sensors. For example, one or more informer apparatuses 30 may provide sensor information/data captured, measured, collected, and/or the like by one or more weather station sensors such that the network apparatus 10 receives the sensor information/data. In an example embodiment, the network apparatus 10 may receive a current and/or expected future weather report(s) from one or more informer apparatuses 30. Based on the sensor information/data and/or the current and/or expected future weather report(s) the network apparatus 10 may determine and/or identify current and/or expected future weather information/data for the geographic area (and/or portions of the geographic area). In various embodiments, the weather information/data may include pavement conditions (e.g., wet, icy, dry, black ice, standing water, snow covered, and/or the like).

At block 306, historical autonomous driving pattern information/data is accessed. For example, the network apparatus 10 may access historical autonomous driving pattern information/data corresponding to the geographic area. For example, the network apparatus 10 may comprise means, such as the processor 12, memory 14, communications interface 16, user interface 18, and/or the like for accessing historical autonomous driving pattern information/data corresponding to the geographic area. For example, the historical autonomous driving patterns information/data may indicate routes, road segments, intersections, and/or the like through/within the geographic area that are commonly used by vehicles 5 that are being autonomously driven (e.g., under the control of the corresponding vehicle apparatus 20); road segments, intersections, and/or the like that have previously proved difficult for vehicles 5 that are being autonomously driven to maneuver, and/or the like. In various embodiments, the historical autonomous driving pattern information/data is determined based on probe information/data that were previously provided by vehicles 5 that were being autonomously driven, based on incident information/data corresponding to vehicles 5 that were being autonomously driven, and/or the like. In an example embodiment, the historical autonomous driving pattern information/data has been previously determined and is accessed from memory 14, and/or the like. In an example embodiment, the historical autonomous driving patterns information/data may include static (e.g., time and current data independent) and dynamic (e.g., time and/or current data dependent) information/data. For example, a particular road segment may be difficult for a vehicle being autonomously driven to maneuver along because of the topology of the road segment (e.g., steep hills, sharp turns, and/or the like) and thus the indication that the particular road segment is difficult for vehicles being autonomously driven to maneuver along is static (e.g., not time dependent and/or independent of changes in the current data). In another example, a particular road segment may be difficult for a vehicle being autonomously driven to maneuver along at certain times of day or during certain events because of large numbers of pedestrians present at the certain times of day or during the certain events and thus the indication that the particular road segment is difficult for vehicles being autonomously driven to maneuver along is dynamic (e.g., time dependent and/or varies based on the current data). In yet another example, a particular road segment may be difficult for a vehicle being autonomously driven to maneuver along during certain weather conditions and thus the indication that the particular road segment is difficult for vehicles being autonomously driven to maneuver along is dynamic (e.g., time dependent and/or varies based on the current data).

At block 308, the autonomous driving instructions are generated. For example, the network apparatus 10 may generate the autonomous driving instructions. For example, the network apparatus 10 may comprise means, such as processor 12, memory 14, and/or the like, for generating the autonomous driving instructions. In an example embodiment, the network apparatus 10 generates autonomous driving instructions based on and/or using an instructions model. For example, the instructions model may be configured and/or programmed to receive the current data and/or historical autonomous driving pattern information/data as inputs and to provide autonomous driving instructions as an output. In an example embodiment, the instructions model uses a developer defined algorithm to generate the autonomous driving instructions based on the current data and/or historical autonomous driving pattern information/data. In an example embodiment, the instructions model is a machine trained (e.g., trained via a machine learning algorithm) neural network, deep net, model, and/or the like that generates autonomous driving instructions based on the current data and/or historical autonomous driving pattern information/data.

In an example embodiment, the instructions model is configured to determine if any human operator zones currently exist and/or are expected to exist within the geographic area within the predefined time period. A human operator zone is at least a portion of a geographic area experiencing (or expected to experience within the predefined time period) traffic and/or weather conditions that are not appropriate for autonomous driving. For example, a human operator zone may be a portion of a geographic area around a traffic accident and/or where emergency personnel and/or first responders are active. In an example embodiment, a human operator zone may be at least a portion of a geographic area experiencing substantial pedestrian traffic, black ice, snow covered roadways, a construction zone with construction workers on site, and/or the like. In various embodiments, when a human operator zone is identified within the geographic region, the autonomous driving instructions indicate that autonomous driving is not allowed, enabled, permitted and/or the like in the human operator zone. In an example embodiment, when a human operator zone is identified within the geographic region, one or more routes at least partially through the geographic region that avoid the human operator zone are determined and may be provided as part of the autonomous driving instructions.

In various embodiments, the autonomous driving instructions may indicate that autonomous driving is or is not enabled, allowed, permitted, and/or the like within one or more portions of a geographic area. For example, a human operator zone may be identified within a geographic area and the autonomous driving instructions may indicate that autonomous driving is not enabled, allowed, permitted, and/or the like within the human operator zone. In an example embodiment, the autonomous driving instructions may comprise one or more suggested routes at least partially through the geographic area that may be and/or should be used by autonomously driven vehicles 5. In an example embodiment, the autonomous driving instructions include at least a portion of the current data. For example, the autonomous driving instructions may include the portion of the current data used to determine the presence a human operator zone identified within the geographic area (e.g., first responders responding to collision on segment 5234, traffic flow rate equal to 0.1 on segment 3422, active construction zone on lane 9834, standing water on lane 2341 and/or the like). For example, the autonomous driving instructions may include the portion of the current data used to determine the one or more suggested routes that may and/or should be used by vehicles 5 being autonomously driven. Thus, in an example embodiment, the autonomous driving instructions may provide instructions regarding portions of a geographic area where a vehicle 5 may be autonomously driven (e.g., under the control of vehicle apparatus 20), portions of the geographic area where a vehicle 5 may not be autonomously driven, and a context for why autonomous driving is or is not allowed, permitted, enabled, and/or the like within at least one of the portions of the geographic area.

At block 310, the autonomous driving instructions are provided. For example, the network apparatus 10 may provide a notification comprising the autonomous driving instructions such that one or more vehicle apparatuses 20 that are located within the geographic area and/or that are expected to be located within the geographic area within a predefined time period receive the autonomous driving instructions and control and/or operate corresponding vehicles 5 having autonomous driving capabilities in accordance with the autonomous driving instructions. For example, the network apparatus 10 may comprise means, such as processor 12, memory 14, communication interface 16, and/or the like, configured for providing a notification comprising the autonomous driving instructions such that one or more vehicle apparatuses 20 receive the notification. In an example embodiment, the predefined time period is the period of time for which the autonomous driving instructions are active and/or valid (or expected to be active and/or valid). For example, the autonomous driving instructions may be active and/or valid for five minutes, ten minutes, fifteen minutes, twenty minutes, thirty minutes, forty-five minutes, sixty minutes and/or the like after the autonomous driving instructions were generated and the autonomous driving instructions may expire thereafter. The predefined time period corresponds to the time that the autonomous driving instructions are active and/or valid, in an example embodiment.

Exemplary Operation of a Vehicle Apparatus

In various embodiments, a vehicle apparatus 20 is onboard and/or coupled to a vehicle 5. For example, the vehicle 5 may have autonomous driving capabilities and the vehicle apparatus 20 may be configured to control the vehicle 5 so as to autonomously drive the vehicle 5. In various embodiments, the vehicle apparatus 20 may receive autonomous driving instructions, process the autonomous driving instructions, and control the vehicle 5 in accordance with the autonomous driving instructions. For example, if the autonomous driving instructions indicate that autonomous driving is not allowed, permitted, or enabled in a first portion of a geographic area, the vehicle apparatus 20 may prevent the vehicle 5 from being autonomously driven in the first portion of the geographic area. For example, the vehicle apparatus 20 may be configured to provide a message to a human operator (e.g., via a user interface 28) of the vehicle indicating that vehicle 5 will enter the first portion of the geographic area in a certain time frame or in a certain distance and that the user will need to take control of the vehicle 5 (or the vehicle apparatus 20 may park the vehicle 5). In an example embodiment, the vehicle apparatus 20 may be configured to provide a message to a human operator of the vehicle indicating that vehicle 5 will enter the first portion of the geographic area in a certain time frame or in a certain distance and ask (e.g., via the user interface 28) if a new route should be determined such that the vehicle apparatus 20 may continue to autonomously drive the vehicle 5. For example, the new route may be determined based on the one or more suggested routes provided by the autonomous driving instructions, in an example embodiment.

FIG. 4 provides a flowchart illustrating operations performed, such as by the vehicle apparatus of FIG. 2B, to control a vehicle 5 in accordance with autonomous driving instructions, according to an example embodiment. Starting at block 402, a vehicle apparatus 20 may provide location information/data. In an example embodiment, the location information/data comprises a current location of the vehicle 5 (e.g., as determined by a location sensor, GNSS sensor, and/or the like onboard the vehicle 5), one or more expected future locations of the vehicle 5 (e.g., a route the vehicle is traversing, one or more points along a route the vehicle is traversing, a destination location of a route the vehicle is traversing, and/or the like). In an example embodiment, the location information/data may comprise an indication, flag, and/or the like indicating that the vehicle 5 has autonomous driving capabilities. For example, a vehicle apparatus 20 may comprise means, such as processor 22, memory 24, communication interface 26, sensors 29, and/or the like for providing location information/data. The network apparatus 10 may receive the location information/data and provide appropriate autonomous driving instructions such that the vehicle apparatus 20 receives the autonomous driving instructions. For example, the network apparatus 10 may provide autonomous driving instructions for a geographic location within which the vehicle 5 is currently located and/or within which the vehicle is expected to be located within the time period that the autonomous driving instructions with be active and/or valid. In an example embodiment, the autonomous driving instructions may be embedded in a digital map (e.g., as a layer within a digital map, as one or more data records within a digital map, and/or the like) and the vehicle apparatus 20 may receive the autonomous driving instructions provided as part of a digital map tile received by the vehicle apparatus 20.

At block 404, a notification comprising autonomous driving instructions is received. In various embodiments, the vehicle apparatus 20 receives a notification comprising autonomous driving instructions provided by a network apparatus 10. For example, the vehicle apparatus 20 may comprise means, such as the processor 22, memory 24, communications interface 26, and/or the like for receiving a notification comprising autonomous driving instructions. For example, the notification may indicate the geographic area corresponding to the autonomous driving instructions and include the autonomous driving instructions. In an example embodiment, the notification is a digital map tile that comprises autonomous driving instructions for one or more autonomous regions that are at least partially located within the geographic region represented by the digital map tile.

At block 406, a message is provided to the human operator indicating the status of autonomous driving. For example, the vehicle apparatus 20 may provide a message, indication, alert, and/or the like that is perceivable by the human operator of the vehicle 5. For example, the vehicle apparatus 20 may comprise means, such as processor 22, memory 24, user interface 28, and/or the like, for providing a message, indication, alert, and/or the like that is perceivable by the human operator of the vehicle 5. For example, the message, indication, alert and/or the like may indicate the status of autonomous driving of the vehicle 5, the status of autonomous driving in a portion of the geographic zone that the vehicle 5 is located in and/or is expected to enter based on a route the vehicle 5 is traversing, an expected change in the status of autonomous driving of the vehicle 5, and/or other information/data regarding autonomous driving and/or the expected need for human intervention at the vehicle's 5 current location and/or expected future location (e.g., based on the route being traversed by the vehicle 5).

For example, the message displayed and/or audibly provided (e.g., by the user interface 28) may state "autonomous driving disable in x minutes," "autonomous driving enable in x minutes," "autonomous driving enable in x km (or miles)," "autonomous driving disable in x km (or miles)," "approaching dangerous area in x minutes, "drive with extreme caution in x km (or miles)", and/or the like, where "x" would be an appropriate value determined based on the autonomous driving instructions and the route being traversed by the vehicle 5. In an example embodiment, the message may provide the human operator of the vehicle 5 with the option of engaging autonomous driving once autonomous driving becomes enabled. For example, the message could state "Autonomous driving enabled in 3 minutes. Engage autonomous driving once enabled?" The human operator may then verbally respond yes or no such that a microphone of the user interface 28 detects the human operator's response or the human operator may physically select a yes or no selectable element displayed by the user interface 28, such that processor 22 of the vehicle apparatus 20 may receive the human operator's response and control the vehicle 5 in accordance therewith. In an example embodiment, the message could state "Autonomous driving disabled in 3 km. Would you like me to find another route so that autonomous driving can be maintained?" The human operator may then verbally respond yes or no such that a microphone of the user interface 28 detects the human operator's response or the human operator may physically select a yes or no selectable element displayed by the user interface 28, such that processor 22 of the vehicle apparatus 20 may receive the human operator's response and control the vehicle 5 in accordance therewith. In an example embodiment, a vehicle apparatus 20 may automatically re-route the vehicle 5 based on the autonomous driving instructions (and/or responsive thereto). In such an embodiment, the vehicle apparatus 20 may provide a human operator perceivable message indicating that the vehicle 5 is being routed and may, in an example embodiment, indicate a reason for the rerouting.

At block 408, the vehicle 5 is operated in accordance with the autonomous driving instructions. For example, the vehicle apparatus 20 may control one or more systems of the vehicle 5 to cause the vehicle 5 to be operated in accordance with the autonomous driving instructions. For example, the vehicle apparatus 20 may comprise means, such as processor 22, memory 24, communication interface 26, and/or the like, for controlling one or more systems of the vehicle 5 to cause the vehicle 5 to be operated in accordance with the autonomous driving instructions. For example, if the vehicle 5 enters a portion of the geographic area (or a geographic area) where autonomous driving is not allowed, permitted, enabled, and/or the like (e.g., an human operator zone), the vehicle apparatus 20 provide an alert to the human operation and may cause the vehicle 5 to park itself if a human operator does not take control of the vehicle 5. For example, if the vehicle 5 enters a portion of the geographic area (or a geographic area) where autonomous driving is allowed, permitted, enabled, and/or the like, the vehicle apparatus 20 may provide an alert to the human operator and/or may start to autonomously drive the vehicle 5. For example, the vehicle apparatus 20 may use the autonomous driving instructions (and/or traffic, incident, weather, and/or map information/data provided as part thereof) to perform one or more navigation functions. Some non-limiting examples of navigation functions are localization, route determination, lane level route determination, route travel time determination, lane maintenance, route guidance, lane level route guidance, provision of traffic information/data, provision of lane level traffic information/data, and/or the like. For example, the vehicle apparatus 20 may use the autonomous driving instructions to determine a new route from the vehicle's 5 current location to the destination location of the vehicle's current route along which autonomous driving may be maintained.

Technical Advantages

Various embodiments of the present invention provide methods, apparatuses, systems, computer program products, and/or the like for generating and providing autonomous driving instructions. Various embodiments of the present invention provide methods, apparatuses, systems, computer program products, and/or the like for receiving autonomous driving instructions, operating a vehicle in accordance with autonomous driving instructions, and/or providing a human operator of a vehicle having autonomous driving capabilities with a message indicating a status and/or status change of autonomous driving. Various embodiments of the present invention provide technical solutions to technical problems regarding the controlling of a vehicle having autonomous, self-driving capabilities by a corresponding vehicle apparatus. For example, the autonomous driving instructions coordinate various driving strategy decisions for vehicles with autonomous, self-driving capabilities within a geographic area. For example, the autonomous driving instructions may cause vehicles with autonomous, self-driving capabilities to avoid portions of a geographic area having high traffic density, high pedestrian density, active first responder and/or emergency activity, and/or the like, and thereby alleviate traffic back up in such portions of the geographic area, improve the operational efficiency of the vehicle, and improve the efficiency of the road network in general within the geographic area.

Additionally, the autonomous driving instructions may provide a vehicle apparatus configured to control a vehicle with autonomous driving capabilities with additional information/data and/or context for making various driving strategy decisions. For example, the autonomous driving instructions may provide the vehicle apparatus within information/data that increases the vehicle apparatuses awareness of various scenarios and/or driving situations which the vehicle apparatus is likely to encounter as the corresponding vehicle travels through at least a portion of the geographic area. For example, the autonomous driving instructions may provide contextual information/data (e.g., traffic, incident, weather, and/or map information/data) that may aid a vehicle apparatus configured to control a vehicle having autonomous driving capabilities to make driving strategy decisions that increase the operational efficiency of the vehicle.

Thus, various embodiments provide for an improvement to the operation of a vehicle apparatus configured to control a corresponding vehicle having autonomous driving capabilities through the use of the autonomous driving instructions by the vehicle apparatus to perform one or more navigation functions and/or provide one or more messages to a human operator of the vehicle regarding the status and/or status change of autonomous driving at the current location of the vehicle and/or an expected future location of the vehicle.

III. Example Apparatus

The network apparatus 10, vehicle apparatus 20, and/or informer apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the network apparatus 10, vehicle apparatus 20, and/or informer apparatus 30 may be embodied in other types of computing devices, such as a server, a personal computer, a computer workstation, a laptop computer, a plurality of networked computing devices or the like. In an example embodiment, a vehicle apparatus 20 is an in-vehicle navigation system and/or vehicle control system onboard a vehicle 5, an informer apparatus 30 is a server and, a network apparatus 10 is a server. In this regard, FIG. 2A depicts an example network apparatus 10 and FIG. 2B depicts an example vehicle apparatus 20 that may be embodied by various computing devices including those identified above.

As shown, the network apparatus 10 of an example embodiment may include, may be associated with, or may otherwise be in communication with a processor 12 and a memory device 14 and optionally a communication interface 16 and/or a user interface 18. Similarly, the vehicle apparatus 20 may comprise a processor 22, memory 24, a communications interface 26, a user interface 28, one or more sensors 29 such as one or more location sensors (e.g., a GNSS sensor; IMU sensors; an odometry system, and/or the like) and/or other components configured to perform various operations, procedures, functions or the like described herein. For example, in an example embodiment, a vehicle apparatus 20 may comprise and/or be in communication with one or more sensors such as, for example, a camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the vehicle apparatus 20 to determine one or more features of the corresponding vehicle's 5 surroundings and/or monitor the vehicle's 5 operating parameters). In various embodiments, the informer apparatus 30 of an example embodiment may include, may be associated with, or may otherwise be in communication with a processor, a memory device, a communication interface, and/or a user interface.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, vehicle apparatus 20, and/or informer apparatus 30 may be embodied by a computing device and/or computing entity. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. Alternatively or additionally, the processor 12, 22 may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, vehicle apparatus 20, and/or informer apparatus 30 may include a user interface 18, 28 that may, in turn, be in communication with the processor 12, 22 to provide output to the user, such as one or more instances of map information/data and/or graphical presentations thereof, one or more routes through a road network (e.g., lane-level routes), and/or the output of one or more other navigation functions, and, in some embodiments, to receive an indication of a user input. As such, the user interface may include one or more output devices such as a display, speaker, and/or the like and, in some embodiments, may also include one or more input devices such as a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware)

stored on a memory accessible to the processor 12, 22 (e.g., memory device 14, 24 and/or the like).

The network apparatus 10, vehicle apparatus 20, and/or informer apparatus 30 may further include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, vehicle apparatus 20, and/or informer apparatus 30 of an example embodiment, a navigation system may also include or have access to a geographic database that includes a variety of data (e.g., map information/data) utilized in constructing a route or navigation path (e.g., a lane-level route), determining the time to traverse the route or navigation path, matching a geolocation (e.g., a GNSS determined location) to a point on a map, a lane of a lane network, and/or link, one or more localization features and a corresponding location of each localization feature, and/or the like. For example, a geographic database may include road segment or link data records, point of interest (POI) data records, localization feature data records, and other data records. More, fewer, or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, travel lane data records, POI data records, and/or other data records. In an example embodiment, the network apparatus 10 may be configured to modify, update, and/or the like one or more data records of the geographic database. For example, the network apparatus 10 may modify, update, generate, and/or the like map information/data corresponding to links, lanes of a road segments, nodes, intersection, POIs, and/or the like and/or the corresponding data records, a localization layer (e.g., comprising localization features) and/or the corresponding data records, and/or the like. In an example embodiment, the network apparatus 10 may configured to access location-based and/or time-dependent obstacle information/data from an OLP environment.

In an example embodiment, the road segment data records are links or segments, e.g., maneuvers of a maneuver graph, representing roads, streets, travel lanes of roads and/or streets, or paths, as can be used in the calculated route or recorded route information for determination of one or more personalized routes (e.g., lane-level routes). The intersection data records are end points corresponding to the respective links or segments of the road segment data records. The road link data records and the intersection data records represent a road network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, travel lanes, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include information/data about the POIs and their respective locations in the POI data records. The geographic database can also include data about places, such as cities, towns, or other communities, and other geographic features, such as bodies of water, mountain ranges, etc. Such place or feature data can be part of the POI information/data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records, or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database may be generated and/or updated based on map information/data generated and/or extracted from sensor information/data provided by vehicle apparatuses 20 through the use of update and/or notification messages. In various embodiments, the vehicle apparatuses 20 may be onboard vehicles owned and/or operated by and/or on behalf of members of the general public or onboard vehicles owned and/or operated as part of a private fleet.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10 and/or vehicle apparatus 20 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of a network apparatus 10 and/or vehicle apparatus 20, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, simplifications, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
receiving an instruction trigger for a geographic area;
accessing current data for the geographic area, the current data comprising at least one of (a) current traffic data for the geographic area, (b) current incident data for the geographic area, or (c) current weather data for the geographic area;
determining, based at least in part on the current data, autonomous driving instructions for the geographic area, wherein the autonomous driving instructions comprise one of (a) an indication that autonomous driving is enabled within at least a portion of the geographic area or (b) an indication that autonomous driving is disabled within the at least a portion of the geographic area;
determining, based at least in part on historical autonomous driving patterns associated with the geographic area, a predefined time period for which the autonomous driving instructions are active and valid; and
providing a notification comprising the autonomous driving instructions such that the notification is received by a vehicle apparatus located within the geographic area or expected to enter the geographic area based on a route being traversed by a vehicle corresponding to the vehicle apparatus,
wherein the vehicle apparatus is onboard the vehicle and is configured to control the vehicle in accordance with the autonomous driving instructions during the predefined time period,
and after which the autonomous driving instructions expire.

2. The method of claim 1, wherein the autonomous driving instructions comprise a suggested route through at least a portion of the geographic area along which autonomous driving is enabled.

3. The method of claim 2, wherein determining the autonomous driving instructions for the geographic area comprises determining the suggested route.

4. The method of claim 1, wherein the current data is real time or near real time accurate.

5. The method of claim 1, wherein the current data comprises dynamic map data.

6. The method of claim 1, wherein the current data comprises at least one of (a) expected future traffic data for the geographic area, (b) expected future incident data for the geographic area, or (c) expected future weather data for the geographic area.

7. The method of claim 1, wherein determining the autonomous driving instructions for the geographic area comprises:
  determining whether a human operator zone exists within the geographic area based on the current data; and
  responsive to determining that a human operator zone exists within the geographic area, generating autonomous driving instructions that (a) disable autonomous driving with the human operator zone, (b) provide a suggested route through at least a portion of the geographic area that avoids the human operator zone, or (c) both disable autonomous driving with the human operator zone and provide a suggested route through at least a portion of the geographic area that avoids the human operator zone.

8. The method of claim 7, wherein a human operator zone is at least a portion of a geographic area experiencing or expected to experience traffic and/or weather conditions that are not appropriate for autonomous driving.

9. An apparatus comprising at least one processor, at least one non-transitory memory storing computer program code, and at least one communications interface configured to communicate via at least one network, the computer program code configured to, when executed by the at least one processor, cause the apparatus to at least:
  receive an instruction trigger for a geographic area;
  access current data for the geographic area, the current data comprising at least one of (a) current traffic data for the geographic area, (b) current incident data for the geographic area, or (c) current weather data for the geographic area;
  determine, based on the current data, autonomous driving instructions for the geographic area, wherein the autonomous driving instructions comprise one of (a) an indication that autonomous driving is enabled within at least a portion of the geographic area or (b) an indication that autonomous driving is disabled within at least a portion of the geographic area;
  determine, based at least in part on historical autonomous driving patterns associated with the geographic area, a predefined time period for which the autonomous driving instructions are active and valid; and
  provide a notification comprising the autonomous driving instructions such that the notification is received by a vehicle apparatus located within the geographic area or expected to enter the geographic area based on a route being traversed by a vehicle corresponding to the vehicle apparatus,
    wherein the vehicle apparatus is onboard the vehicle and is configured to control the vehicle in accordance with the autonomous driving instructions during the predefined time period,
    and after which the autonomous driving instructions expire.

10. The apparatus of claim 9, wherein the autonomous driving instructions comprise a suggested route through at least a portion of the geographic area along which autonomous driving is enabled.

11. The apparatus of claim 9, wherein determining the autonomous driving instructions for the geographic area comprises determining the suggested route.

12. The apparatus of claim 9, wherein the current data is real time or near real time accurate.

13. The apparatus of claim 9, wherein the current data comprises dynamic map data.

14. The apparatus of claim 9, wherein the current data comprises at least one of (a) expected future traffic data for the geographic area, (b) expected future incident data for the geographic area, or (c) expected future weather data for the geographic area.

15. The apparatus of claim 9, wherein determining the autonomous driving instructions for the geographic area comprises:
  determining whether a human operator zone exists within the geographic area based on the current data; and
  responsive to determining that a human operator zone exists within the geographic area, generating autonomous driving instructions that (a) disable autonomous driving with the human operator zone, (b) provide a suggested route through at least a portion of the geographic area that avoids the human operator zone, or (c) both disable autonomous driving with the human operator zone and provide a suggested route through at least a portion of the geographic area that avoids the human operator zone.

16. A computer program product comprising at least one non-transitory computer-readable storage medium having computer-executable program code instructions stored therein, the computer-executable program code instructions comprising program code instructions configured to, when executed by a processor of an apparatus, cause the apparatus to at least:
  receive an instruction trigger for a geographic area;
  access current data for the geographic area, the current data comprising at least one of (a) current traffic data for the geographic area, (b) current incident data for the geographic area, or (c) current weather data for the geographic area;
  determine, based at least in part on historical autonomous driving patterns associated with the geographic area, a predefined time period for which the autonomous driving instructions are active and valid; and
  provide a notification comprising the autonomous driving instructions such that the notification is received by a vehicle apparatus located within the geographic area or expected to enter the geographic area based on a route being traversed by a vehicle corresponding to the vehicle apparatus,
    wherein the vehicle apparatus is onboard the vehicle and is configured to control the vehicle in accordance with the autonomous driving instructions during the predefined time period,
    and after which the autonomous driving instructions expire.

17. The computer program product of claim 16, wherein determining the autonomous driving instructions for the geographic area comprises:
  determining whether a human operator zone exists within the geographic area based on the current data; and
  responsive to determining that a human operator zone exists within the geographic area, generating autonomous driving instructions that (a) disable autonomous driving with the human operator zone, (b) provide a suggested route through at least a portion of the geographic area that avoids the human operator zone, or (c)

both disable autonomous driving with the human operator zone and provide a suggested route through at least a portion of the geographic area that avoids the human operator zone.

18. The method of claim 1, wherein the autonomous driving instructions are determined based at least in part on a trained neural network machine learning algorithm.

* * * * *